March 8, 1932.  A. H. EMERY, JR  1,848,468
MACHINE FOR TESTING THE STRENGTH OF MATERIALS
Filed June 13, 1929   3 Sheets-Sheet 1
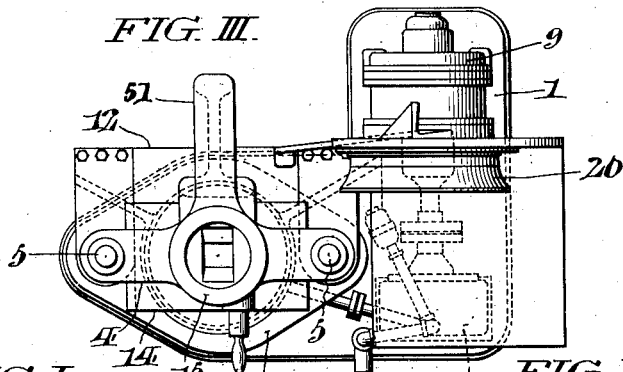
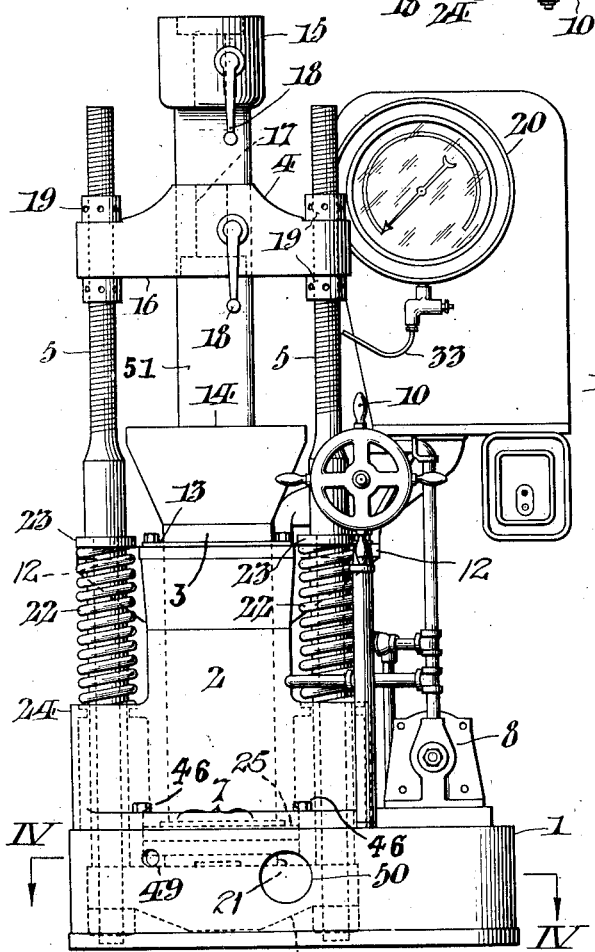
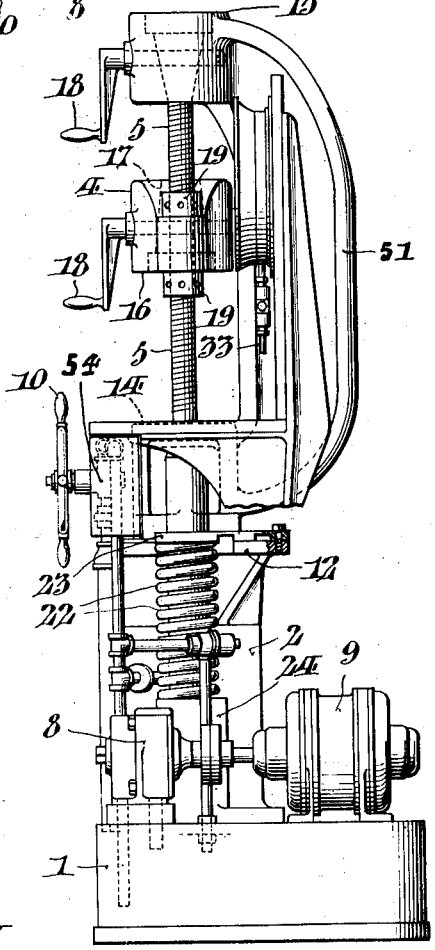
WITNESSES
INVENTOR:
Albert H. Emery Jr.
BY
ATTORNEYS.

March 8, 1932. A. H. EMERY, JR 1,848,468
MACHINE FOR TESTING THE STRENGTH OF MATERIALS
Filed June 13, 1929   3 Sheets-Sheet 2
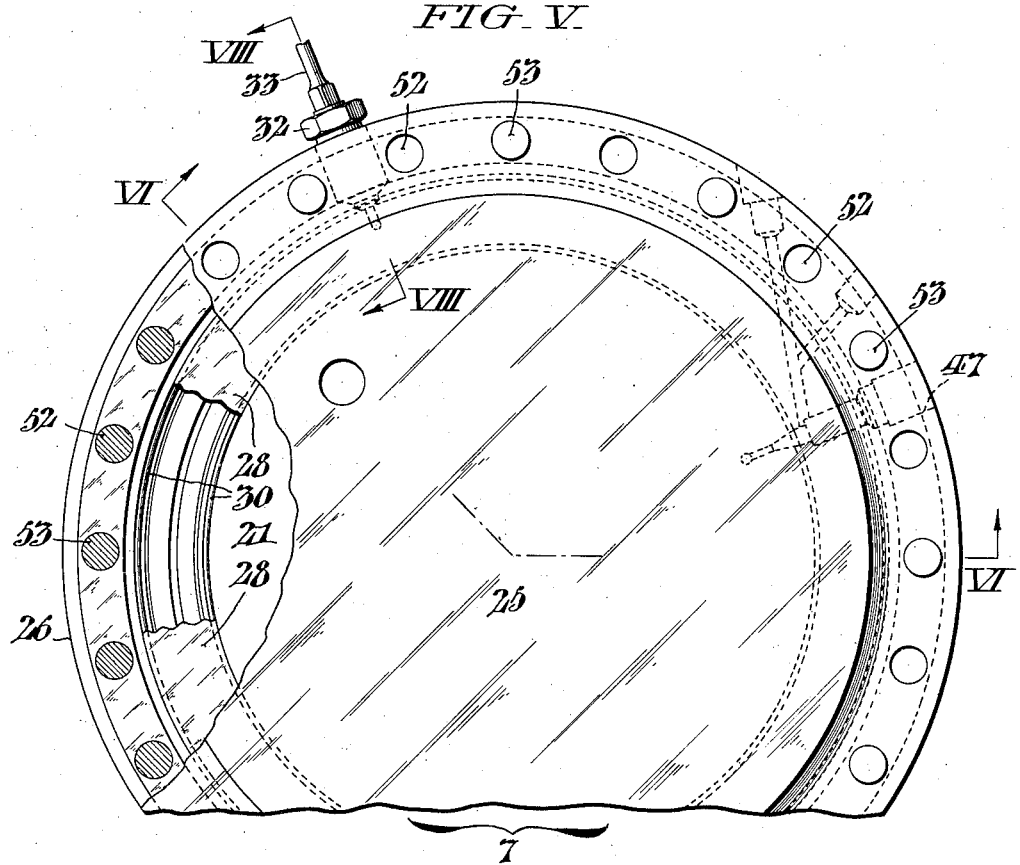
FIG. V.
FIG. IV.
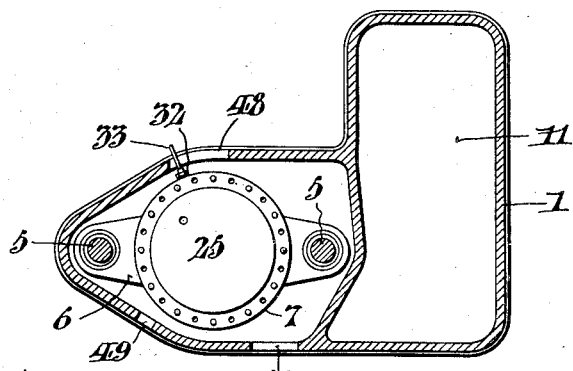
WITNESSES
John A. Weidler
William Bell
INVENTOR:
Albert H. Emery Jr.
BY
ATTORNEYS.

March 8, 1932. A. H. EMERY, JR 1,848,468
MACHINE FOR TESTING THE STRENGTH OF MATERIALS
Filed June 13, 1929 3 Sheets-Sheet 3
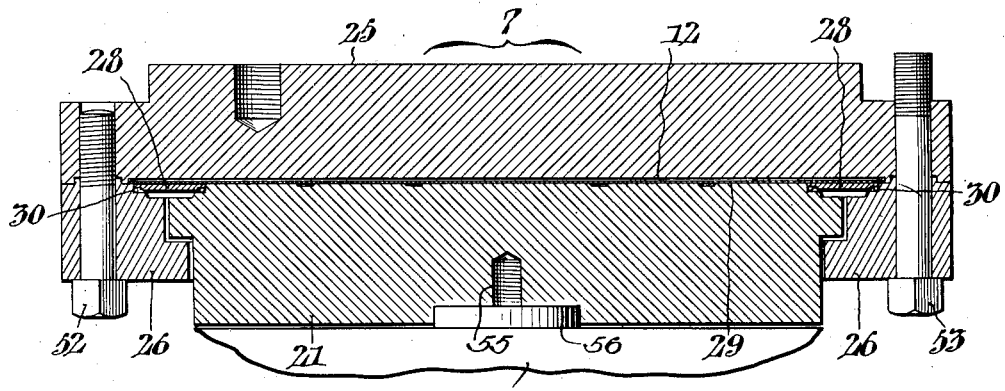
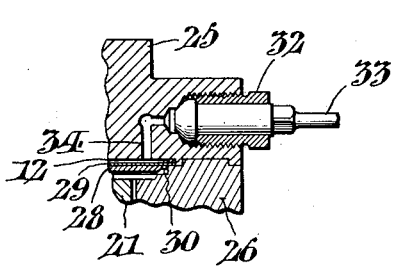
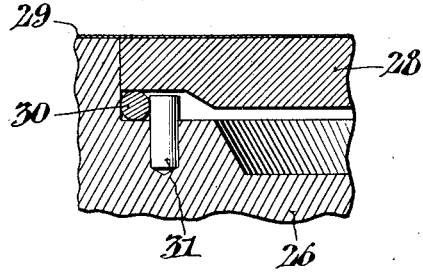

Patented Mar. 8, 1932

1,848,468

UNITED STATES PATENT OFFICE

ALBERT H. EMERY, JR., OF STAMFORD, CONNECTICUT, ASSIGNOR TO EMERY-TATNALL COMPANY, OF STAMFORD, CONNECTICUT, A CORPORATION OF DELAWARE

MACHINE FOR TESTING THE STRENGTH OF MATERIALS

Application filed June 13, 1929. Serial No. 370,551.

This invention relates to machines for testing the strength of materials either in tension or in compression.

The principal object of the invention is to provide a testing machine characterized by accuracy of measurement and reliability of operation. This end I accomplish in part by the provision of separate means for stressing the specimen under test and for measuring the load, the stressing means acting upon one side of the specimen and the measuring means including a hydraulic support to which the load is transmitted from the other side of the specimen.

A more specific object of the invention is to provide in such a machine means for transmitting the load on the specimen to the hydraulic support without appreciable friction loss.

Another object of the invention is to provide in such a machine means for producing a constant pressure or initial load upon the hydraulic support preparatory to the operation of the machine.

Another object of the invention is to provide an improved hydraulic support for converting the load into fluid pressure, said support being characterized by means rendering the acting area of the support unchanging with relative movement between the column and base of the support.

Still other objects and advantages of the invention will be apparent from the detailed description which follows and which has reference to the embodiment of the invention illustrated in the accompanying drawings, whereof:

Fig. I shows a vertical front elevation of the testing machine.

Fig. II shows a side elevation of the same with certain parts broken away for clearness in illustration.

Fig. III shows a top plan view of the same.

Fig. IV shows a section of the testing machine taken along the line IV—IV of Fig. I, the hydraulic support being shown in elevation.

Fig. V shows a top plan view of the hydraulic support with a portion of its base and bridge ring broken away.

Fig. VI shows a cross-section of the hydraulic support, taken along the lines VI—VI of Fig. V, and a fragmentary portion of the yoke which acts upon said support.

Fig. VII shows an enlarged detailed view of the bridge ring of the hydraulic support and the method of supporting the same; and Fig. VIII is a section taken on the lines VIII—VIII of Fig. V, and shows the method of connecting the pipe which leads from the support to the indicator or gage.

With particular reference to Figs. I and II, the stressing end of the machine is shown comprising generally a base 1, a hydraulic cylinder 2 resting on and secured to the base by means of bolts 46, and a piston 3 having a goose neck shaped extension 51. The scale or weighing end of the machine comprises a yoke 4, parallel columns in the form of rods 5, a cross-head 6, and a hydraulic support, diagrammatically indicated in dotted lines at 7. The details of the support are shown in Figs. V, VI, VII and VIII.

To produce the load on the specimen I preferably employ a hydraulic pump 8 driven by an electric motor 9, with suitable means such as a hand wheel 10 for controlling through a valve 54 the hydraulic pressure supplied to the base of the cylinder 2. A cistern 11 may be conveniently located in the base 1, as shown in Fig. IV, to serve as a reservoir for the hydraulic medium of the pump 8. However, the details of the pump and the manner of controlling its operation are immaterial to the invention. Likewise the details of the hydraulic cylinder 2 and the portion of the piston 3 within the cylinder are immaterial to the invention, which contemplates a variety of means for initiating the load to be produced upon the specimen. Where the piston leaves the cylinder 2, the piston is packed and guided by means of a packing gland 13.

The upper or goose neck portion of the piston comprises an integral piece provided with a load platen in the form of a platform 14 adapted to carry the specimen when it is to be tested for strength of material in compression, and an oppositely disposed load platen in the form of a holder 15 adapted to carry the specimen when it is to be tested for tensile strength. In either case the load from the stressing disposed load platen in the form of end of the machine is imparted through the specimen to the yoke 4,—in compression to the lower face 16 of the yoke, and in tension to the holder 17 in the upper part of the yoke 4. Handles for operating the grips for holding the specimen in tension are shown at 18. The grips may, of course, be of any convenient form and their details are not material to the invention.

To provide for adjustment of the yoke 4, the parallel rods 5 are threaded, and nuts 19 which are rotatable in the ends of the yoke 4 engage the threaded rods 5. By turning the nuts 19, the yoke 4 may be elevated or lowered in an obvious manner.

Formed with the casting of the cylinder 2 at its upper end is a flange 12 to which are bolted flexible stay plates 23. The stay plates 23 are recessed in two places to provide the requisite flexibility and are rigidly attached to the rods 5. They prevent any lateral movement of the rods 5 while allowing moderate movement in a vertical plane without appreciable friction, thus keeping the specimen and the rods 5 in proper alignment with respect to the stationary elements of the machine.

The rods 5 are connected at their lower ends by means of a cross-head 6 which bears directly upon the column 21, shown in Fig. VI, of the hydraulic support 7. Each rod 5 is fitted with a helical spring 22, engaging at its upper end a stay plate 23 on the rod and at the lower end a part 24 of the casting of the cylinder 2. The springs 22 serve a double purpose. They not only carry the weight of the rods 5 and the yoke 4, but they produce a constant pressure or initial load on the hydraulic support.

The details of the hydraulic support 7, which is located directly beneath the cylinder 2, are shown in Fig. VI, the support being of the general type illustrated in United States Letters Patent #918,488 to Albert H. Emery, but constituting an improvement thereon. The hydraulic support comprises generally a movable column 21, which receives the thrust or load from the cross-head 6, a base 25 which is stationary and forms the cylinder head for the cylinder 2, and an annular casing ring 26 surrounding the pressure column 21. The cross-head 6 has a circular boss 56 fitting within a correspondingly shaped recess in the center of the column 21. In the column 21 there is also shown a threaded hole 55 in which a lifting eye-bolt may be inserted for convenience in handling. The base 25 of the hydraulic support is perforated circumferentially to provide for fastening bolts 52 which hold the casing ring 26 in place and alternate longer bolts 53 for securing the hydraulic support to the cylinder 2 of the straining end of the machine. Thus the base 25 of the hydraulic support carries on its upper side the hydraulic medium for producing the load and on its under side the hydraulic medium for measuring the load. Both the column 21 and the casing ring 26 have annular recesses to accommodate a bridge ring 28. A flexible metal diaphragm 29 forms a fluid-tight connection between the casing ring 26 and column 21, at the same time allowing for moderate vertical movement of the column 21 with respect to the base 25, the diaphragm being supported by means of the bridge ring 28. The diaphragm is clamped at its periphery between the opposing faces of the base 25 and casing ring 26.

The bridge ring 28 in turn is shown supported by wire rings 30, as appears more clearly in Fig. VII, which are adjacent each edge of the bridge ring and which are held in position by means of pins 31 spaced at intervals circumferentially of the recesses of the column 21 and casing ring 26. It is most desirable that the bearing surfaces of the bridge ring be made small so as to insure a uniform acting area of the support. Heretofore, bridge rings with comparatively thin edges bearing on angular surfaces have been used, necessitating the use of very hard material to sustain the large pressure of the liquid on the bridge.

With the novel construction shown, the bridge ring may be of substantial thickness at its bearing surface, and, as the line of tangency of the surface of the bridge ring to each wire ring 30 varies within very small limits with the motion of the column 21, the bridge ring is supported on two circles of practically unchanging diameters. The rings 30 are preferably made of music wire.

The space 12 forming the pressure chamber between the column 21 and base 25 is filled with a substantially incompressible liquid and communicates with a pipe line 33 leading to the pressure gage 20. Any force on the column 21 is resisted by the liquid, and as the liquid is contained in a closed system, it produces a hydraulic pressure which is proportional to the force and to the acting area of the support. The bridge ring 28 springs under the load as the column moves slightly up or down, and the acting area of the support, being approximately the area enclosed by a circle the diameter of which is the mean diameter of the ring, does not vary with the relative position of the column 21 and base 25, as the lines of support on the faces of the bridge ring are practically unchanging as has been hereinbefore explained.

In Fig. VIII there is shown the connection 32 by which liquid from the pressure chamber 12 may flow into the line 33 to the pressure gage 20. The connection 32 is threaded and screwed into the base 25, the opening in the base communicating by means of a short passage 34 with the liquid above the bridge ring 28.

A connection for filling the hydraulic support is adapted to fit within a threaded recess, indicated at 47 in Fig. V, which communicates with the pressure chamber between the base 25 and diaphragm 29. Additional openings 56 and 57 are shown in the base 25 of the hydraulic support, these openings leading to pipe taps 58 and 59 to which connections may be fitted to provide for the filling of the pressure chamber from a different source or for a variety of other uses. As shown in Fig. IV the base 1 of the testing machine is provided with an opening 48 permitting the passage to the hydraulic support of the line for filling and the line 33 which leads to the pressure gage 20. Additional openings 49 and 50 in the front of the base 1 permit access to the hydraulic support of feeler gages and other instruments.

The operation of the apparatus will be apparent from the description herein of the functions of each element. The force exerted by the piston 3 in the hydraulic cylinder 2, governed by the pressure created in the pump 8, produces the load on the specimen. This load, however, cannot be accurately measured by the pressure at the pump because of the friction in the cylinder. To obtain an accurate measurement of the load, the measuring end of the machine, as distinguished from the stressing end includes a hydraulic support in which friction loss is negligible, and the load on the specimen is communicated to the column of the support. The load is transmitted to the hydraulic fluid in the pressure chamber of the support and to the line to the gage, the pressure in this line being directly proportional to the load.

While I have illustrated and described one embodiment of my invention in some detail, it will be apparent to those skilled in this art that changes may be made in the form of the apparatus shown without departing from the spirit of my invention, as defined in the appended claims, and that certain features of the invention may be used to advantage without a corresponding use of other features.

Having thus described my invention, I claim:

1. In a machine for testing the strength of materials in tension or in compression, stressing means for producing a load upon the specimen under test, said means including a piston having a platform for carrying the specimen when in compression and having a goose neck shaped extension for carrying the specimen when in tension, a yoke interposed between said platform and holder, a hydraulic support for converting mechanical pressure into hydraulic pressure, and spring urged rods associated with the yoke aforesaid for transmitting the load on the specimen to said hydraulic support and for producing an initial load on said hydraulic support.

2. In a machine for testing the strength of materials in tension or in compression, a hydraulic cylinder, a piston therein, said piston having a goose neck shaped extension for carrying one end of the specimen under test, a yoke to which the load is transmitted through the other end of the specimen, a hydraulic support for converting mechanical pressure into hydraulic pressure and means associated with the yoke aforesaid for transmitting the load on the specimen to said hydraulic support.

3. In a machine for testing the strength of materials, stressing means for producing a load upon the specimen under test, said means including a cylinder and a piston operating in said cylinder; and a hydraulic support for converting the load produced upon the specimen into hydraulic pressure, said support including a movable column, a stationary base forming the head of the cylinder aforesaid and a diaphragm between said column and base.

4. In a machine for testing the strength of materials in tension or in compression, stressing means for producing a load upon the specimen under test, including a cylinder, and a piston operating in said cylinder, said piston having a platform for carrying the specimen when in compression and a holder for carrying the specimen when in tension; a yoke interposed between said platform and holder; a hydraulic support for converting the load produced upon the specimen into hydraulic pressure, said support including a base forming the head of the cylinder aforesaid, and a movable column; and means associated with the yoke aforesaid for transmitting the load on the specimen to the column of said hydraulic support.

5. In a machine for testing the strength of materials in tension or in compression, a hydraulic cylinder, a piston in said cylinder, a goose neck shaped extension on said piston for carrying one end of the specimen under test, a yoke to which the load is transmitted through the other end of the specimen, a hydraulic support for converting mechanical pressure into hydraulic pressure, said support including a base forming the head of the said hydraulic cylinder and a movable column, and means associated with the yoke aforesaid for transmitting the load on the specimen to the column of said hydraulic support.

6. In a machine for testing the strength of materials including separate means for producing and for measuring the load, the load measuring means including a hydraulic support comprising a stationary base, a casing ring secured to said base, a column within said casing ring and capable of moderate movement relative thereto, a diaphragm and bridge ring spanning the space between said column and casing ring, and wire rings for supporting said bridge ring at its inner and outer edges.

7. In a machine for testing the strength of materials including separate means for producing and for measuring the load, the load measuring means including a hydraulic support comprising a stationary base, a column movable with respect to said base, a metal diaphragm between said column and base, a bridge ring supporting said diaphragm, and wire rings for supporting said bridge ring at its inner and outer edges.

8. In a machine for testing the strength of materials including separate means for producing and for measuring the load, the load measuring means including a hydraulic support comprising a stationary base, a casing ring secured to said base, a column within said casing ring and capable of moderate movement relative thereto, a diaphragm and bridge ring spanning the space between said column and casing ring, wire rings for supporting said bridge ring at its inner and outer edges, and pins circumferentially disposed on said column and casing ring for holding said wire rings in place.

9. In a machine for testing the strength of materials including separate means for for producing and for measuring the load, the load measuring means including a hydraulic support comprising a stationary base, an annularly recessed casing ring secured to said base, an annularly recessed column movable within said ring, a diaphragm and bridge ring spanning the space between said column and casing ring, and wire rings in the annular recesses of said casing ring and column for supporting said bridge ring at its inner and outer edges.

10. In a machine for testing the strength of materials in tension or in compression, stressing means for producing a load upon the specimen under test, said means including a cylinder, a piston movable in said cylinder and having a goose neck extension, a platform at one end of said goose neck extension adapted to bear upon the specimen when in compression, a holder at the other end of said goose neck extension adapted to carry the specimen when in tension, a yoke interposed between said platform and holder, a hydraulic support for converting the load produced upon the specimen into hydraulic pressure, rods associated with the yoke aforesaid for transmitting the load on the specimen to said hydraulic support, and flexible stay plates attached to the cylinder aforesaid and adapted to guide the movement of said rods.

11. In a machine for testing the strength of materials in tension or in compression stressing means for producing a load upon the specimen under test, said means including a platform adapted to bear upon the specimen when tested for strength in compression, and a holder for carrying the specimen when tested for tensile strength, a yoke interposed between said platform and holder, a hydraulic support for converting the load produced upon said specimen into hydraulic pressure, and spring urged rods associated with the yoke aforesaid for transmitting the load on the specimen to said hydraulc support and for producing an initial load upon said support.

12. In a machine for testing the strength of materials in tension or in compression stressing means for producing a load upon the specimen under test, said means including a platform adapted to bear upon the specimen when tested for strength in compression, and a holder for carrying the specimen when tested for tensile strength, a yoke interposed between said platform and holder, a hydraulic support for converting the load produced upon said specimen into hydraulic pressure, spring urged rods associated with the yoke aforesaid for transmitting the load upon the specimen to said hydraulic support, and flexible stay plates for guiding the movement of said rods.

13. In a machine for testing the strength of materials in tension or in compression, stressing means for producing a load upon the specimen under test, said means including a cylinder, a piston movable in said cylinder and having an extension including oppositely disposed load platens, one of said platens affording a platform adapted to bear upon the specimen when tested for strength in compression, and the other platen affording a holder adapted to carry the specimen when tested for tensile strength, a yoke interposed between said load platens, a hydraulic support for measuring the load, and means associated with the yoke aforesaid for transmitting the load on the specimen to said hydraulic support.

14. In a machine for testing the strength of materials in tension or in compression, stressing means for producing a load upon the specimen under test, said means including a load platen adapted to bear upon the specimen when tested for strength in compression, and a load platen for carrying the specimen when tested for tensile strength, a yoke interposed between said platens, a hydraulic support for converting the load produced upon said specimen into hydraulic pressure, means associated with the yoke aforesaid for transmitting the load on the specimen to said hydraulic support, and means for producing an initial load upon said support.

15. In a machine for testing the strength of materials in tension or in compression, stressing means for producing a load upon the specimen under test, said means including a load platen adapted to bear upon the specimen when tested for strength in compression, and a load platen for carrying the specimen when tested for tensile strength, a yoke interposed between said platens, a hydraulic support for converting the load produced upon said specimen into hydraulic pressure, said support including a stationary base and a movable column, a cross head bearing upon said movable column, rods connecting the yoke aforesaid with said cross head, and springs for producing an initial load upon said movable column through said cross head.

16. In a machine for testing the strength of materials in tension or in compression, stressing means for producing a load upon the specimen under test, said means including a load platen adapted to bear upon the specimen when tested for strength in compression, and a load platen for carrying the specimen when tested for tensile strength, a yoke interposed between said platens, a hydraulic support for converting the load produced upon said specimen into hydraulic pressure, columns associated with the yoke aforesaid for transmitting the load on the specimen to said hydraulic support, means for producing an initial load upon said support, and flexible stay plates for guiding the movement of said columns.

In testimony whereof, I have hereunto signed my name at Stamford, Conn., the 8th day of June, 1929.

ALBERT H. EMERY, Jr.